(12) United States Patent
Moreno Mengibar et al.

(10) Patent No.: US 10,332,512 B2
(45) Date of Patent: Jun. 25, 2019

(54) NEGATIVE N-GRAM BIASING

(71) Applicant: Google LLC, Mountain View, CA (US)

(72) Inventors: Pedro J. Moreno Mengibar, Jersey City, NJ (US); Petar Aleksic, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/605,475

(22) Filed: May 25, 2017

(65) Prior Publication Data
US 2017/0270918 A1  Sep. 21, 2017

Related U.S. Application Data

(63) Continuation of application No. 14/739,287, filed on Jun. 15, 2015, now Pat. No. 9,691,380.

(51) Int. Cl.
*G10L 15/22* (2006.01)
*G10L 15/197* (2013.01)
*G10L 15/19* (2013.01)
*G10L 15/01* (2013.01)

(52) U.S. Cl.
CPC .......... *G10L 15/197* (2013.01); *G10L 15/01* (2013.01); *G10L 2015/228* (2013.01)

(58) Field of Classification Search
CPC ........ G06F 17/243; G06F 17/21; G06F 17/24; G06F 17/241; G06F 17/242; G06F 17/245; G06F 17/248; G06F 17/3061; G06F 3/0484; G06F 3/0487; G06F 17/212; G06F 3/0488; G06F 17/211; G06F 17/2785; G06F 17/30722

USPC ..... 704/1–10, 231, 250–251, 255, 257, 266, 704/235, 275, 243
See application file for complete search history.

(56) References Cited

U.S. PATENT DOCUMENTS

| | | |
|---|---|---|
| 5,390,279 A | 2/1995 | Strong |
| 6,904,405 B2 | 6/2005 | Suominen |
| 8,965,763 B1 | 2/2015 | Chelba et al. |
| 2005/0055209 A1 | 3/2005 | Epstein et al. |
| 2005/0137868 A1 | 6/2005 | Epstein et al. |
| 2013/0346077 A1 | 12/2013 | Mengibar et al. |
| 2013/0346078 A1* | 12/2013 | Gruenstein ............. G10L 15/26 704/235 |
| 2014/0195226 A1 | 7/2014 | Yun et al. |

(Continued)

*Primary Examiner* — Dwayne D Bost
*Assistant Examiner* — Stephen M Brinich
(74) *Attorney, Agent, or Firm* — Fish & Richardson P.C.

(57) ABSTRACT

Methods, systems, and apparatus, including computer programs encoded on a computer storage medium, for performing dynamic, stroke-based alignment of touch displays. In one aspect, a method includes obtaining a candidate transcription that an automated speech recognizer generates for an utterance, determining a particular context associated with the utterance, determining that a particular n-gram that is included in the candidate transcription is included among a set of undesirable n-grams that is associated with the context, adjusting a speech recognition confidence score associated with the transcription based on determining that the particular n-gram that is included in the candidate transcription is included among the set of undesirable n-grams that is associated with the context, and determining whether to provide the candidate transcription for output based at least on the adjusted speech recognition confidence score.

18 Claims, 3 Drawing Sheets

(56) References Cited

U.S. PATENT DOCUMENTS

2014/0303973 A1    10/2014  Amarilli et al.
2014/0365209 A1*   12/2014  Evermann ............. G06F 17/279
                                                                    704/9
2016/0179774 A1     6/2016  McAteer et al.
2017/0032781 A1*    2/2017  Sharifi .................. G10L 15/197

* cited by examiner

NEGATIVE N-GRAM BIASING

CROSS-REFERENCE TO RELATED APPLICATION

This application is a continuation of U.S. application Ser. No. 14/739,287, filed Jun. 15, 2015, the contents of which are hereby incorporated by reference.

FIELD

The present specification relates to automated speech recognition (ASR).

BACKGROUND

Automated speech recognition (ASR) systems assign probabilities to sequences of speech or text known as n-grams. ASR systems transcribe utterances into a series of computer-readable sounds, which are then compared to a dictionary of words in a given language. The n-gram can be used to help select the most likely transcription of an utterance.

Current ASR systems are complex, and include multiple components such as acoustic models, language models, lexicons, and knowledge sources from search infrastructures such as knowledge graphs, and natural language processing (NLP) annotations with semantic and morphological information. As a result, improving the performance of ASR systems and correcting common transcription can involve time consuming training cycles that are difficult to implement.

SUMMARY

Transcription errors in ASR systems are common in numerous situations. For instance, when ASR systems receive audio signals that include significant background noise, the ASR often produces incorrect recognition hypotheses such as "wow wow wow wow." In other instances, when the audio signals include inflected languages, the ASR sometimes prefers one inflected form over another even if the preferred form makes no grammatical sense. For example, if a user says "los gatos," the ASR may consistently hypothesize "los gata," where the feminine singular noun "gata" is in disagreement with the masculine plural determinant "los." This situation is common for languages such as Russian, Serbian, or Turkish, which include complex language inflections. ASR systems also frequently misrecognize words or phrases for other nonsensical phrases that have similar pronunciations. For example, if a user says "cancel command," the ASR may hypothesize "cancer command" based on the user's accent.

Preventing ASR transcription errors is often a complex proposition. For instance, techniques that include data curation, filtering, and rejection of incorrect training corpora in acoustic and language model sources followed by subsequent retraining of the language models, often take weeks to complete. Other techniques include injecting morphological knowledge into the language model, which may reduce the probability of errors, but also involves adding further complexity to the ASR system, developing additional NLP components, and requiring weeks of training. Another technique involves curating the language model sources to reduce the probability of wrongly hypothesized phrases while positively increasing the probabilities associated with correctly hypothesized phrases. However, this technique is also time consuming to implements as it includes changing components of complex systems without any guarantees that transcription performance may be improved.

Accordingly, one innovative aspect of the subject matter described in this specification can be embodied in processes that dynamically bias language models by negatively biasing particular phrases or n-grams that are identified as undesirable because they are likely to cause transcription errors. For instance, negative biasing of the undesirable n-grams within a language model reduces the probability that the ASR hypothesizes them in a transcription for an utterance. In some instances, negative biasing can be based on context data that indicates incorrect phrases for a particular user context. In addition, negatively biasing n-grams enables the ASR system to reduce common recognition errors rapidly without retraining language models or performing complex data curation or filtration techniques.

Negative n-gram biasing may be used to reduce the likelihood of transcribing a mistakenly hypothesized phrase of a voice query. The n-gram negative bias may be active for all queries, e.g., for errors reported from users, or wrongly inflected n-grams, e.g., highly inflected languages, or for particular queries that commonly cause mistakenly hypothesized phrases. In some implementations, the n-gram negative bias may also be personalized for individual users using acoustic information about the user's speech, reoccurring mistakes made with particular phrases used by the user, or analyzing previously submitted queries. In other implementations, the n-gram negative bias may also be triggered based on the acoustic conditions of the voice query such as the signal-to-noise ratio.

For situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, zip code, or state level, so that a particular location of a user cannot be determined. Thus, the user may have control over how information is collected about him or her and used by a content server.

Implementations may include one or more of the following features. For example, a computer-implemented method may include: obtaining a candidate transcription that an automated speech recognizer generates for an utterance; determining a particular context associated with the utterance; determining that a particular n-gram that is included in the candidate transcription is included among a set of undesirable n-grams that is associated with the context; adjusting a speech recognition confidence score associated with the transcription based on determining that the particular n-gram that is included in the candidate transcription is included among the set of undesirable n-grams that is associated with the context; and determining whether to provide the candidate transcription for output based at least on the adjusted speech recognition confidence score.

Other versions include corresponding systems, apparatus, and computer programs, configured to perform the actions of the methods encoded on computer storage devices.

One or more implementations may include the following optional features. For example, in some implementations, the set of undesirable n-grams includes common incorrect phrases associated with the particular context associated with the utterance.

In some implementations, the methods includes: obtaining a context profile associated with the particular context, where the context profile specifies (i) one or more n-grams, and, (ii) for each of the one more n-grams, a value that reflects an extent to which the candidate transcription includes the n-gram specified in the context profile.

In some implementations, adjusting the speech recognition confidence score associated with the transcription includes multiplying a value representing the speech recognition confidence score and the value that reflects an extent to which the candidate transcription includes the n-gram specified in the context profile.

In some implementations, determining a particular context associated with the utterance includes: determining a likely context associated with a user submitting the utterance; comparing the likely context associated with the user to a particular context specified by the context profile; and determining, based at least on comparing the likely context associated with the user to the particular context specified by the context profile, that the particular context specified by the context profile is associated with the utterance.

In some implementations, the methods include: receiving (i) audio data that encodes an utterance, and (ii) context data; obtaining candidate recognition hypotheses for the utterance that an automated speech recognizer generates based on the audio data; obtaining a context profile associated with the received context data, where the context profile specifies (i) one or more n-grams, and, (ii) for each of the one more n-grams, a value that reflects an extent to which a score associated with a candidate recognition hypothesis that includes the n-gram to be biased; for each candidate recognition hypothesis that includes an n-gram specified in the context profile, biasing the score associated with the candidate recognition hypothesis based at least on the corresponding value specified for the n-gram; selecting, from among the candidate recognition hypotheses, a particular candidate recognition hypothesis based at least on (i) the score, for each candidate recognition hypothesis that does not include an n-gram specified in the context profile, and (ii) the biased score, for each candidate recognition hypothesis that does include an n-gram specified in the context profile; and providing the particular candidate recognition hypothesis for output.

In some implementations, the score associated with a candidate recognition hypothesis represents a speech recognition confidence score.

In some implementations, biasing the score associated with the candidate recognition hypothesis includes negatively biasing the score based at least on the context profile associated with the received context data.

In some implementations, biasing the score associated with the candidate recognition hypothesis includes negatively biasing the score based at least on determining that the audio data includes low signal-to-noise ratio audio data.

In some implementations, biasing the score associated with the candidate recognition hypothesis includes negatively biasing the score based at least on determining that the audio data includes audio data encoding utterances that include highly inflected language queries.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

One innovative aspect of the subject matter described in this specification can be embodied in processes that dynamically bias language models by negatively biasing particular phrases or n-grams that are identified as undesirable because they are likely to cause transcription errors. For instance, negative biasing of the undesirable n-grams within a language model reduces the probability that the ASR hypothesizes them in a transcription for an utterance. In some instances, negative biasing can be based on context data that indicates incorrect phrases for a particular user context. In addition, negatively biasing n-grams enables the ASR system to reduce common recognition errors rapidly without retraining language models or performing complex data curation or filtration techniques. Specific details about the implementations of the subject matter will become apparent in the descriptions and drawings below.

Figure 1:
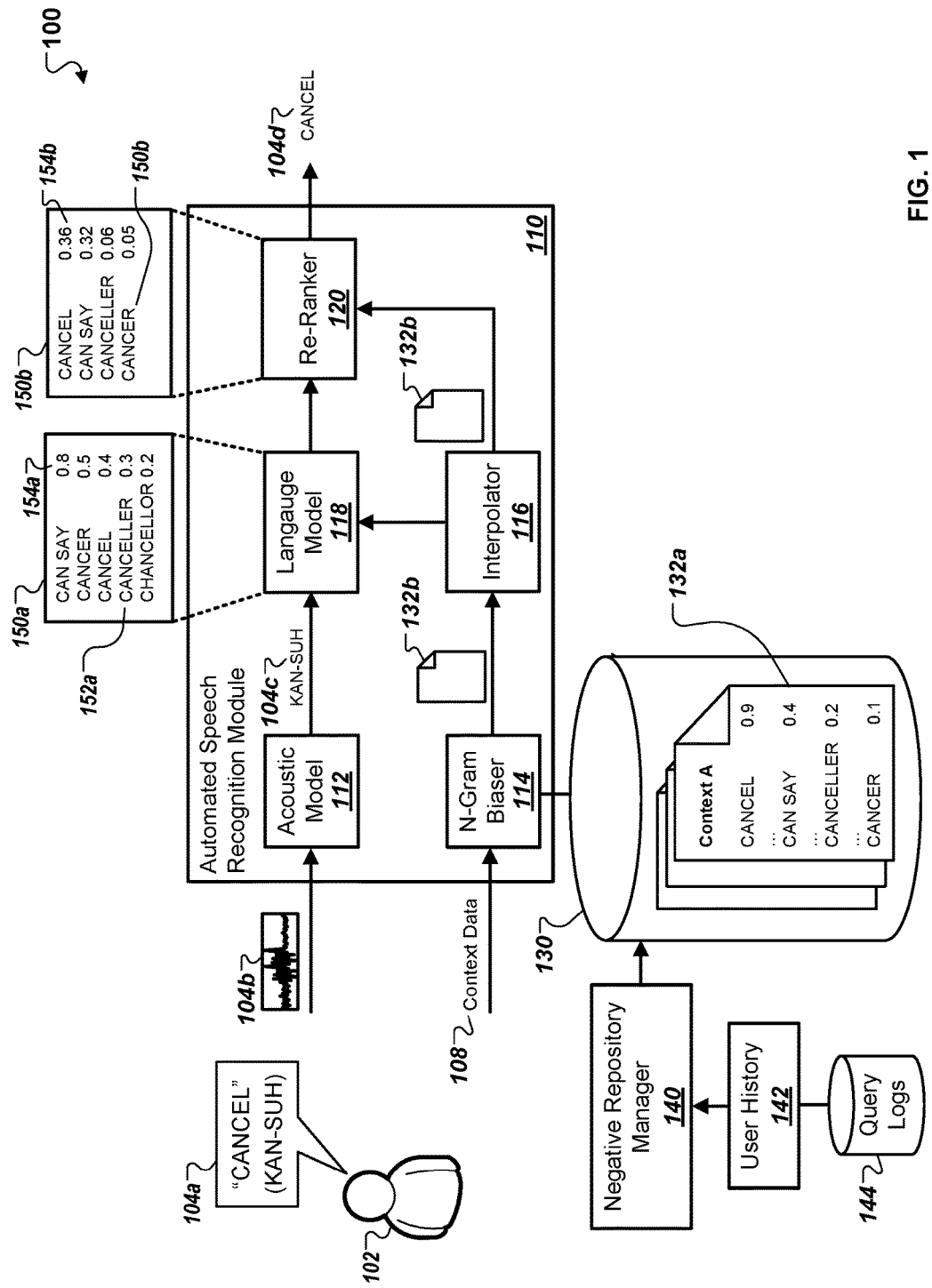
FIG. 1 is a diagram that illustrates an example system for negative n-gram biasing modulation.

FIG. 1 is a diagram that illustrates an example system for negative n-gram biasing modulation. The system 100 includes an automated speech recognition module (ASRM) 110, a storage module 130, and a negative repository manager 140. The ASRM 110 further includes an acoustic model 112, an n-gram biaser 114, an interpolator 116, a language model 118, and a re-ranker 120. The system 100 also includes context profiles 132a-b stored on the storage module 130, and a negative repository manager 140.

The ASRM 110 receives audio data 104b that encodes a voice query 104a and context data 108 generated by a user 102. The user 102 may submit the voice query 104a using a user device that may be any type of computing devices such as a smartphone, tablet computer, laptop computer, or a desktop computer. The voice query 104a may include various types voice-enabled input such as voice searches, voice commands, or dictation that are recognized and processed by the ASRM 110 using common speech recognition techniques. As represented in the example in FIG. 1, the user 102a may submit a voice command 104 that includes the voice query "CANCEL," and is encoded as audio data 104b. The acoustic model 112 transcribes the received audio data 104b and generates an utterance 104c based on the received audio data 104b. As shown, "CANCEL" voice query may include the utterance "KAN-SUH" based on the characteristics of the audio data 104b.

The utterance 104c is transmitted to the language model 118, which generates the set of candidate transcriptions 150a including various candidate transcriptions 152a that are recognition hypotheses for the utterance 104c. The language model 118 also calculates a speech recognition confidence score 154a for each candidate transcription. The confidence score 154a may represent, for instance, the likelihood that the particular candidate transcription 152a represents an accurate recognition hypothesis of the utterance 104c given the voice query 104b. As shown in the example in FIG. 1, the acoustic model 112 generates the utterance "KAN-SUH" for the voice query 104a where the user 102 says "CANCEL." Based on the utterance 104c, the language model 118 determines a set of candidate transcriptions 150a, which includes "CAN SAY," "CANCER," "CANCEL," "CANCELLER," or "CHANCELLOR" and corresponding confidences scores 154a of 0.8, 0.5, 0.4, 0.3, and 0.2, respectively.

In some instances, the value of the confidence score 154a associated with each candidate transcription 152a may be based on attributes of the voice query 104a such as the signal-to-noise ratio, the type of language of the voice query 104a, or speech inflections used in by the user 102 in the voice query 104a. For example, if the voice query 104a is produced in a noisy environment, e.g., with significant background noise, then the ASRM 110 assigns lower confidence scores 154a for each candidate recognition hypothesis 152a based on the signal-to-noise ratio of the audio data 104b.

The context data 108 associated with the voice query 104a is received by the n-gram biaser 114 of the ASRM 110. The context data 108 may information relating to a particular context associated with the user 102 such as time intervals between repeated voice queries, gaze tracking data that reflects eye movement from a front-side camera near the screen of a user device, or other types of indicator data that enables the ASRM 1110 to determine a particular context associated with the user 102 when submitting the voice query 104a. In some instances, the context data 108 includes prior voice queries sent to the ASRM 110 within a particular time period, e.g., five minutes, or data indicating user activity when sending the voice query 104a, such as the type of mobile application used, the location of the user, the type of device used, or the current time. In other instances, the context data may indicate the type of voice query 104a submitted to the ASRM 110, such whether the voice query 104a is a command, a request, or a search query to a search engine. For example, as depicted in the example in FIG. 1, the context data 108 surrounding the voice query 104a "CANCEL" indicates that the query is a command in response to an action currently taking place in a recent application accessed by the user 102 on an electronic device.

After receiving the context data 108, the n-gram biaser 114 parses through various context profiles 132a stored on the storage module 130. The context profile 132a may be an archived library including undesirable n-grams that are associated with a common particular context. For example, a context profile 132a may include different n-grams for are associated with each other for a particular context.

The context profile 132a specifies a value associated with each undesirable n-gram that represents an extent to which the candidate transcription 152a of the utterance 104c includes the specified n-gram included in the context profile 132a. As represented in the example, for the utterance "KAN-SUH," the n-gram biaser may select a context profile 132a that includes the n-grams "CANCEL," CAN SAY," "CANCELLER," and "CANCER," based on context data 108 indicating that the user has previously submitted a voice query command to the ASRM 110 within a short time frame.

In this example, the context profile includes a value of 0.9 for the "CANCEL" n-gram, which indicates that given the received context data 108, the candidate transcription 152a is likely to include this n-gram. In addition, the context profile 132a includes a 0.1 score for "CANCER" since the context data 108 indicates that this n-gram is unlikely to be included in the candidate transcription 152a. In this example, "CANCER" is the most undesirable n-gram because it is unlikely to represent an accurate transcription of the voice query "CANCEL" given the context data indicating that the user is attempted to cancel an ongoing operation.

In some implementations, storage module 130 that stores the context profile 132a may be local storage within a client device that includes the ASRM 110. For example, the storage module may be located on a smartphone used to by the user 102 to send a voice query 104a to the ASRM 110. In other implementations, the storage module 130 may be located on a remote server that exchanges communications with a client device, e.g., a smartphone, a tablet, or a laptop computer that includes the ASRM 110. In such instances, the ASRM 110 may exchange communications with the server in response to receiving a voice query such as the voice query 104a to access the stored context profiles 132a.

In some implementations, the storage module 130 also includes context profiles 132a including undesirable n-grams associated with particular contexts that are selected from the negative repository manager 140. For example, the negative repository manager 140 may be a software module that stores user history 142 data and accesses query logs 144 including previously submitted queries, prior context data, or user browsing history. For instance, the user history 142 may be used to indicate successful and unsuccessful transcriptions of prior voice queries by the ASRM 110. In these instances, the undesirable n-grams included in the context profile 132a represent common mistakes by the ASRM 110 associated with particular voice queries, incorrect transcriptions of voice queries based on particular language inflections, or nonsensical phrases that are commonly generated by the ASRM 110 in response to frequent voice queries.

In some implementations, the negative repository manager 140 is generated for each individual user 102 based on the user history 142 of the user 102. For example, the ASRM 110 uses the user history 142 to track previous user behavior in order to determine whether a particular candidate transcription 152a is an accurate recognition hypothesis of the utterance 104a. In response, the system 100 may store results from previous voice query transcriptions into the query logs 144, which also includes previous context data 108 associated with the voice query transcriptions. The ASRM 110 then uses the dynamically updated negative repository managers 140 to generate more accurate candidate recognition hypotheses 152a for subsequent voice queries by associating the voice queries with corresponding data stored within the query logs 144.

In some implementations, the negative repository manager 140 may be a software module included within the ASRM 110 that includes common transcription mistakes made for all users using particular voice recognition software. For example, in such instances, the negative repository manager 140 may include a list of undesirable words or sequences that are common for all users that provide voice queries to the ASRM 110. For instance, the negative repository manager 140 may include profanity, nonsensical transcriptions, or words with very low probabilities of being associated with voice queries (e.g., cancer).

After the n-gram biaser 118 selects a particular context profile 132a that corresponds to the received context data 108, the n-gram biaser 114 transmits the selected context profile 132b to the interpolator 116. The interpolator 116 parses the selected context profile 132b, and extracts the each of the n-grams included and their associated values. In some implementations, the interpolator 116 transmits the list of n-grams and associated values directly to the language model 118 for biasing the candidate transcriptions 152a. In such instances, the interpolator 116 extracts n-grams and associated values from the selected context profile 132b and transmits them to the language model 118.

In some implementations, the interpolator 116 negatively biases the set of candidate transcriptions 150a based on the received context profile 132b. For example, the interpolator 116 adjusts the confidence score 154a associated with the candidate recognition hypothesis 150a that includes n-grams specified within the context profile. As shown in the example in FIG. 1, the interpolator 116 modulates the confidence score 154a of "8.0" associated with the candidate transcription "CAN SAY," based on the value "0.4" specified in the context profile 132a. For instance, in one example, the interpolator 116 negatively biases the confidence score 154a by multiplying the value "0.4" to calculate a biased confidence score 154b of "0.36." This biased confidence score reflects the likelihood that the candidate recognition hypothesis 152b, "CAN SAY," represents the correct transcription of "KAN-SUH" given the received context data 108. Other implementations may include alternative biasing operations to negatively bias the confidence scores 154a.

The re-ranker 120 generates a biased set of candidate transcriptions 150b that includes biased transcriptions 152b and biased confidence scores 154b based on the negative biasing techniques described previously. After the re-ranker 120 generates the list of biased candidate transcriptions 150b, the re-ranker 120 selects the particular biased candidate transcription 152b with the highest biased confidence score 154b, based on the negative biasing operation, and designates it as the selected recognition hypothesis 104d for output by the ASRM 110. As shown in the example in FIG. 1, the re-ranker 120 selects "CANCEL" as the selected recognition hypothesis 150b based on determining that it has the highest biased confidence score 154b value "0.36," which represents the biased likelihood that the recognition hypothesis 150b accurately represents the transcription of the utterance "KAN-SUH." The ASRM 110 then provides the selected recognition hypothesis, "CANCEL," for output. Also shown is biased confidence score "CANCER," which is "0.05." Although the initial confidence score 152a for "CANCER" is higher than the initial confidence score for "CANCEL," based on the hypothesized transcription of "KAN-SUH," the biased confidence score is lower because the received context data indicates that "CANCER" is an undesirable n-gram for the particular context surrounding the voice query 104a even though the "KAN-SUH" utterance is ambiguous. This example demonstrates how context-based negative biasing may be used to prevent transcriptions errors by the ASRM 110.

In some implementations, the re-ranker 120 also performs the negative biasing operations using the selected context profile 132b transmitted by the interpolator 116. In other implementations, the interpolator 116 biases the confidence scores 154a of the candidate transcriptions 152a and transmits a list of biased transcriptions 150b and the corresponding biased confidence scores 154b to the re-ranker 120, which then generates the set of biased recognition hypotheses 150b. As shown in the example in FIG. 1, in some instances, the set of biased transcriptions 150b includes a partial list of the original set of candidate transcriptions 150a. In such instances, the re-ranker 120 removes particular recognition hypotheses 152a if their corresponding biased confidence scores 154b are below a threshold value, e.g., "0.04" in the example.

In other instances, the re-ranker 120 remove particular candidate hypotheses 152a that include undesirable n-grams as identified by the selected context profile 132b. For example, as shown in the example, the recognition hypothesis "CHANCELLOR" is not included in the biased set of candidate recognition hypotheses 150b because the selected context profile 132b may indicate that it is an undesirable n-gram given the context data provided with the voice query "CANCEL." In such instances, the selected context profile 132b and the negative biasing modulation is used as a filter mechanism to prevent the ASRM 110 from outputting incorrect selection hypotheses that may by selected by the language model 118 but are inappropriate in the context of the user 102.

Figure 2:
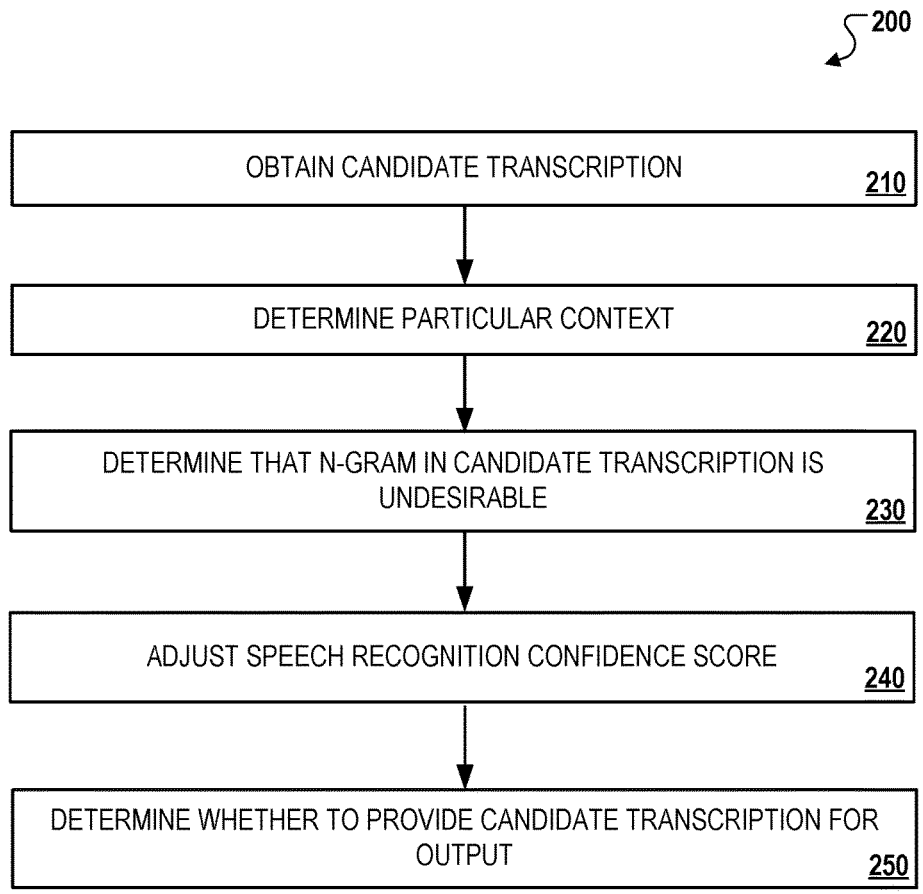
FIG. 2 illustrates an example process for performing negative n-gram biasing modulation.

FIG. 2 illustrates an example process 200 for performing negative n-gram biasing modulation. Briefly, the system 100 obtains a candidate description (210), determines a particular context (220), determines that an n-gram in the candidate transcription is undesirable (230), adjusts a speech recognition confidence core, and determines whether to provide the candidate transcription for output (250).

In more detail, the system 100 initially obtains a candidate transcription that an automated speech recognizer generates for an utterance (210). For example, the ASRM 110 may obtain a candidate transcription 152a using the set of candidate recognition hypotheses 150a generated based on the utterance 104c. The obtained candidate transcription 152a also includes an associated confidence score 154a. As shown in the example in FIG. 1, in some instances, the system 100 may obtain multiple candidate transcriptions based on the various candidate recognition hypotheses for the utterance 104b generated by the language model 118.

The system 100 determines a particular context associated with the utterance (220). For example, the ASRM 110 initially receives context data 108 associated with the audio data 104b. In some implementations, the system 100 determines the particular context associated with the utterance 104c by initially determining a likely context associated with the user based on the received context data 108 that indicates conditions under which the voice query 104b is sent to the ASRM 110. In response, a context profile 132a that corresponds to the likely context is selected. For example, the n-gram biaser 114 selects a particular context profile 114 from a set of context profiles for various likely contexts based on the user history 142.

In some implementations, the particular context is identified by the particular application used by the user 102a to transmit the voice query 104a. For example, if the user is using a search application such as Google now, the system 100 may determine that the user in the likely context of submitting a search query.

The system 100 determines that a particular n-gram that is included in the candidate transcription is included among a set of undesirable n-grams that is associated with the context (230). For example, the language model 118 initially generates a set of candidate recognition hypotheses 150a, which includes one or more candidate transcriptions 152a. In addition, the n-gram biaser 114 selects a context profile 132a that includes a set of undesirable n-grams selected from the negative repository manager 140. The n-gram biaser 114 transmits the selected context profile 132a with the undesirable n-grams to the interpolator 116, which determines whether the candidate transcriptions include any of the undesirable n-grams identified in the context profile 132a.

In some implementations, the negative repository manager 140 selects undesirable n-grams dynamically based on the user history 142, which may include previously submitted voice queries, browsing activity, previous candidate transcriptions, or other user specific information that may be stored in query logs 144. In other implementations, the negative repository manager 140 includes a standard list of undesirable n-grams that are identified through user-submitted or system-generated bug reports, or other software quality assurance testing. In such implementations, the undesirable n-grams may include profanity or words that are highly unlikely to be associated with common types of voice queries such as search requests, voice commands, or automated reminders.

The system 100 adjusts a speech recognition confidence score associated with the candidate transcription (240). For example, the interpolator 116 or the re-ranker 120 negatively biases the confidence score 154a associated with the particular candidate transcription 152a based on determining that the particular candidate transcription 152a includes an undesirable n-gram identified by the context profile 132a. For instance, the context profile 132a includes a value that represents the extent to which the candidate transcription 152a includes the undesirable n-gram specified in the context profile 132a. The interpolator 116 or the re-ranker 120 negatively biases the confidence score 154a by performing an operation the value associated with the undesirable n-gram specified in the context profile 132a. The interpolator 116 or the re-ranker 120 then generates a biased speech recognition confidence score 154b, which represents the modulated confidence score 150a given the received context data 108 associated with the voice query 104a.

In some instances, the particular negative biasing operation performed may be modulated based on using context profiles with different values associated with undesirable n-grams to modulate the negative biasing operation. For example, the context profiles 132a may include larger weight values to particular undesirable n-grams if the context data indicates that the user in within a particular context that is highly susceptible to incorrect transcriptions, e.g., high signal-to-noise ratio of the audio data. In such examples, the n-gram biaser 114 may select a particular context profile 132a with larger values associated with the undesirable n-grams to increase the strength of negative n-gram biasing.

The system 100 determines whether to provide the candidate transcription for output (250). For example, after the speech recognition confidence score 154a has been negatively biased based on identifying that the candidate transcription includes an undesirable n-gram, the re-ranker 120 determines, based on the biased confidence score 154a associated with the candidate transcriptions 152a, which one of the particular candidate transcription 152b should be output by the ASRM 110. In some instances, the re-ranker 120 selects the particular candidate transcription with the highest biased confidence score 154b.

In other instances, the ASRM 110 sets a threshold value for biased confidence score 154a associated with the candidate transcriptions 152b that is required for output. In such implementations, if the biased confidence score 154a is below the threshold, the re-ranker 120 may remove the associated candidate transcription 152b from the set of biased candidate transcriptions 150b. In instances where none of the biased speech recognition confidence scores 154a meet the threshold, the ASRM 110 transmits an error message to the user indicating that the voice query 104b is unable to be recognized.

Figure 3:
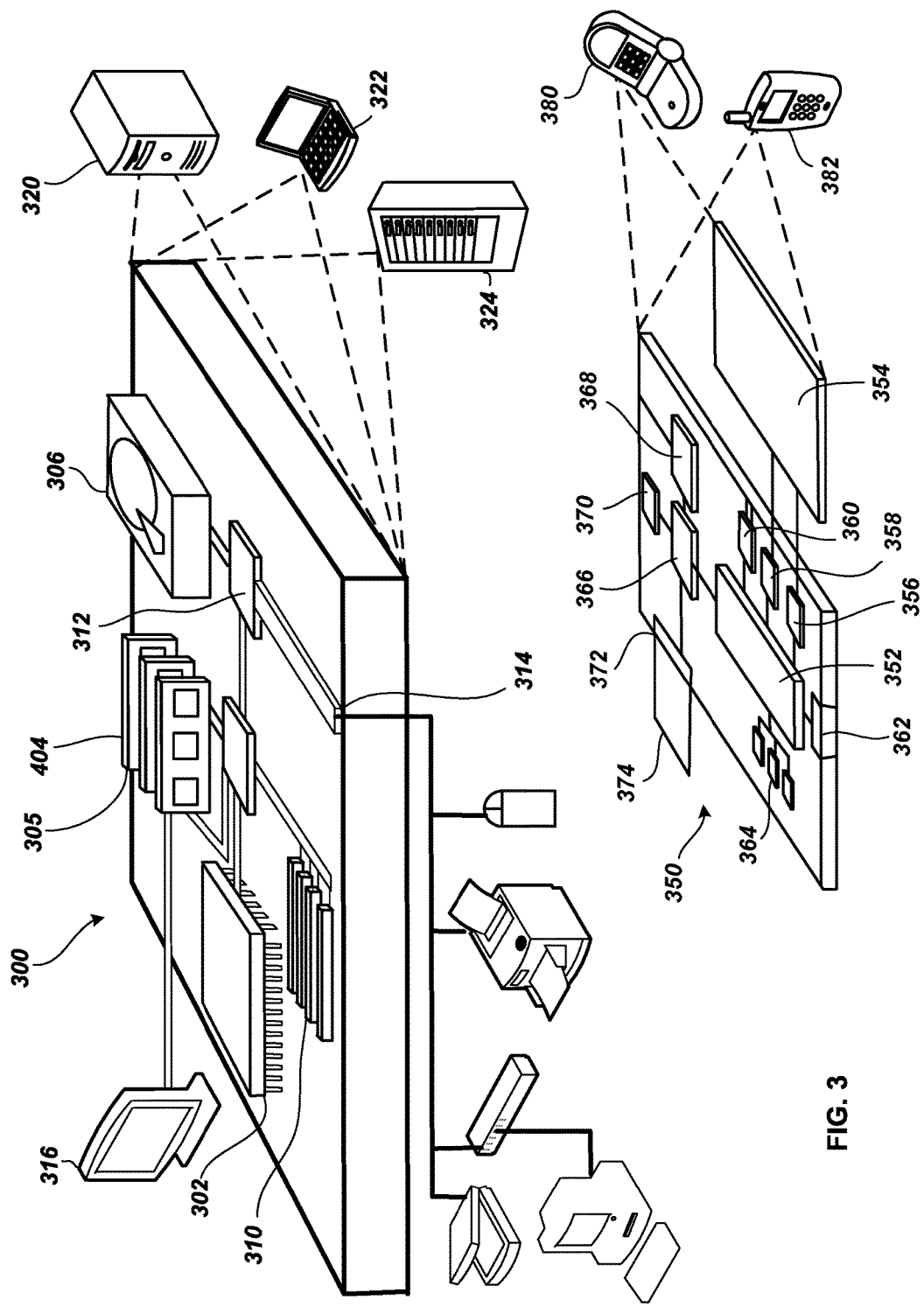
FIG. 3 is a block diagram of computing devices on which the processes described herein, or portions thereof, may be implemented.

FIG. 3 is a block diagram of computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally computing device 300 or 350 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth intensive operations. Such allocation of functions is exemplary only.

In one implementation, the high-speed controller 308 is coupled to memory 304, display 316, e.g., through a graphics processor or accelerator, and to high-speed expansion ports 310, which may accept various expansion cards (not shown). In the implementation, low-speed controller 312 is coupled to storage device 306 and low-speed expansion port 314. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter. The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, and an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. Additionally, the processor may be implemented using any of a number of architectures. For example, the processor 310 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound, e.g., voice messages, music files, etc. and may also include sound generated by applications operating on device 350.

The computing device 350 may be implemented in a number of different forms, as shown in the figure. For example, it may be implemented as a cellular telephone 480. It may also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving data identifying a term that a user has designated as likely to be included in error in one or more future, automatically generated transcriptions that are subsequently generated by an automated speech recognizer using an original language model when the user speaks in a particular context;
   after designating the term as likely to be included in error in the one or more future, automatically generated transcriptions, receiving audio data corresponding to a user speaking the term when the user is in the particular context;
   generating a biased language model that, in contrast to the original language model, reduces one or more probabilities associated with the term that the user has designated as likely to be included in error when the user speaks in the particular context;
   generating, by the automated speech recognizer and using the biased language model that is biased to reduce the one or more probabilities associated with the term that the user has designated as likely to be included in error when the user speaks in the particular context, a transcription that includes a different term substituted for the term that the user has designated as likely to be included in error in the one or more future, automatically generated transcriptions; and
   providing the transcription for output.

2. The method of claim 1, wherein the term includes a commonly incorrect phrase associated with the particular context.

3. The method of claim 1, wherein generating the transcription that includes a different term comprises:
   determining a first speech recognition confidence score associated with a first candidate transcription that includes the term;
   determining a second speech recognition confidence score associated with a second candidate transcription that includes the different term substituted for the term; and
   determining that the second speech recognition confidence score exceeds the first speech recognition confidence score.

4. The method of claim 1, wherein generating the transcription that includes a different term comprises:
   identifying one or more terms that (i) are associated with the particular context and (ii) are identified as alternatives to the term;
   generating a candidate transcriptions for each of the one or more identified terms;
   computing a speech recognition confidence score for each of the generated candidate transcriptions; and
   selecting a particular candidate transcription from among the generated candidate transcriptions based at least on the computed speech recognition confidence scores.

5. The method of claim 1, comprising:
   obtaining a context profile associated with the particular context, the context profile specifying (i) one or more terms, and (ii) for each of the one or more terms, a value that reflects an extent to which a candidate transcription includes the terms specified in the context profile; and selecting the different term from among the one or more terms specified within the context profile to substitute for the term.

6. The method of claim 1, wherein the transcription that includes the different term substituted for the term is based on determining that the audio data corresponding to the user uttering the term while the user is associated with the particular context comprises audio data encoding utterances that include highly inflected language queries.

7. A system comprising:
one or more computers; and
one or more storage devices storing instructions that, when executed by the one or more computers, cause the one or more computers to perform operations comprising:
receiving data identifying a term that a user has designated as likely to be included in error in one or more future, automatically generated transcriptions that are subsequently generated by an automated speech recognizer using an original language model when the user speaks in a particular context;
after designating the term as likely to be included in error in the one or more future, automatically generated transcriptions, receiving audio data corresponding to a user speaking the term when the user is in the particular context;
generating a biased language model that, in contrast to the original language model, reduces one or more probabilities associated with the term that the user has designated as likely to be included in error when the user speaks in the particular context;
generating, by the automated speech recognizer and using the biased language model that is biased to reduce the one or more probabilities associated with the term that the user has designated as likely to be included in error when the user speaks in the particular context, a transcription that includes a different term substituted for the term that the user has designated as likely to be included in error in the one or more future, automatically generated transcriptions; and
providing the transcription for output.

8. The system of claim 7, wherein the term includes a commonly incorrect phrase associated with the particular context.

9. The system of claim 7, wherein generating the transcription that includes a different term comprises:
determining that a first speech recognition confidence score exceeds a second speech recognition confidence score.

10. The system of claim 7, wherein generating the transcription that includes a different term comprises:
determining a first speech recognition confidence score associated with a first candidate transcription that includes the term;
determining a second speech recognition confidence score associated with a second candidate transcription that includes the different term substituted for the term; and
determining that the second speech recognition confidence score exceeds the first speech recognition confidence score.

11. The system of claim 7, wherein the operations further comprise:
obtaining a context profile associated with the particular context, the context profile specifying (i) one or more terms, and (ii) for each of the one or more terms, a value that reflects an extent to which a candidate transcription includes the terms specified in the context profile; and selecting the different term from among the one or more terms specified within the context profile to substitute for the term.

12. The system of claim 7, wherein the transcription that includes the different term substituted for the term is based on determining that the audio data corresponding to the user uttering the term while the user is associated with the particular context comprises audio data encoding utterances that include highly inflected language queries.

13. A non-transitory computer-readable storage device encoded with computer program instructions that, when executed by one or more computers, cause the one or more computers to perform operations comprising:
receiving data identifying a term that a user has designated as likely to be included in error in one or more future, automatically generated transcriptions that are subsequently generated by an automated speech recognizer using an original language model when the user speaks in a particular context;
after designating the term as likely to be included in error in the one or more future, automatically generated transcriptions, receiving audio data corresponding to a user speaking the term when the user is in the particular context;
generating a biased language model that, in contrast to the original language model, reduces one or more probabilities associated with the term that the user has designated as likely to be included in error when the user speaks in the particular context;
generating, by the automated speech recognizer and using the biased language model that is biased to reduce the one or more probabilities associated with the term that the user has designated as likely to be included in error when the user speaks in the particular context, a transcription that includes a different term substituted for the term that the user has designated as likely to be included in error in the one or more future, automatically generated transcriptions; and
providing the transcription for output.

14. The device of claim 13, wherein the term includes a commonly incorrect phrase associated with the particular context.

15. The device of claim 13, wherein generating the transcription that includes a different term comprises:
determining that a first speech recognition confidence score exceeds a second speech recognition confidence score.

16. The device of claim 13, wherein generating the transcription that includes a different term comprises:
identifying one or more terms that (i) are associated with the particular context and (ii) are identified as alternatives to the term;
generating a candidate transcriptions for each of the one or more identified terms;
computing a speech recognition confidence score for each of the generated candidate transcriptions; and
selecting a particular candidate transcription from among the generated candidate transcriptions based at least on the computed speech recognition confidence scores.

17. The device of claim 13, wherein the operations further comprise:
obtaining a context profile associated with the particular context, the context profile specifying (i) one or more terms, and (ii) for each of the one or more terms, a value that reflects an extent to which a candidate transcription includes the terms specified in the context profile; and selecting the different term from among the one or more terms specified within the context profile to substitute for the term.

18. The device of claim 13, wherein the transcription that includes the different term substituted for the term is based on determining that the audio data corresponding to the user uttering the term while the user is associated with the particular context comprises audio data encoding utterances that include highly inflected language queries.

* * * * *